United States Patent
Ashizawa et al.

(10) Patent No.: US 12,344,248 B2
(45) Date of Patent: Jul. 1, 2025

(54) METHOD AND DEVICE FOR CONTROLLING VEHICLE ACCELERATION ON A CURVED ROAD USING CURVE INFORMATION

(71) Applicant: Nissan Motor Co., Ltd., Yokohama (JP)

(72) Inventors: Hiroyuki Ashizawa, Kanagawa (JP); Masahiro Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 177 days.

(21) Appl. No.: 18/021,510

(22) PCT Filed: Aug. 20, 2020

(86) PCT No.: PCT/JP2020/031433
§ 371 (c)(1),
(2) Date: Feb. 15, 2023

(87) PCT Pub. No.: WO2022/038738
PCT Pub. Date: Feb. 24, 2022

(65) Prior Publication Data
US 2023/0294697 A1    Sep. 21, 2023

(51) Int. Cl.
*B60W 30/16*    (2020.01)
*B60W 40/072*   (2012.01)
*B60W 40/105*   (2012.01)

(52) U.S. Cl.
CPC ........ *B60W 30/162* (2013.01); *B60W 40/072* (2013.01); *B60W 40/105* (2013.01); *B60W 2552/30* (2020.02)

(58) Field of Classification Search
CPC ............ B60W 30/162; B60W 40/072; B60W 40/105; B60W 2552/30
See application file for complete search history.

(56) References Cited

U.S. PATENT DOCUMENTS

| | | | |
|---|---|---|---|
| 2012/0271483 A1* | 10/2012 | Samukawa | B60W 30/16 701/1 |
| 2014/0100756 A1 | 4/2014 | Schwindt | |
| 2015/0094927 A1 | 4/2015 | Takahashi et al. | |
| 2017/0158195 A1* | 6/2017 | Uchida | B60W 30/143 |
| 2018/0345953 A1 | 12/2018 | Mizoguchi | |
| 2018/0362001 A1* | 12/2018 | Inou | B60W 30/18145 |

(Continued)

FOREIGN PATENT DOCUMENTS

| CN | 103625472 A | 3/2014 |
|---|---|---|
| JP | 2003-162799 A | 6/2003 |

(Continued)

*Primary Examiner* — James J Lee
*Assistant Examiner* — Jonathan E Reinert
(74) *Attorney, Agent, or Firm* — Young Basile Hanlon & MacFarlane, P.C.

(57) ABSTRACT

When accelerating a vehicle toward a set speed after the vehicle travels on a curved road at a vehicle speed equal to or lower than a speed limit based on the curved road, a driving support method and a driving support device accelerate the vehicle by a first acceleration in a case of acquiring a curve information related to the curved road, and accelerate the vehicle by a second acceleration smaller than the first acceleration in a case of not acquiring the curve information.

6 Claims, 2 Drawing Sheets

(56) References Cited

U.S. PATENT DOCUMENTS

2020/0164870 A1    5/2020  Takahashi et al.
2020/0180614 A1    6/2020  Goto et al.

FOREIGN PATENT DOCUMENTS

| JP | 2015-67270 A  | 4/2015  |
| JP | 2016-500598 A | 1/2016  |
| JP | 2017-47710 A  | 3/2017  |
| JP | 2018-203084 A | 12/2018 |
| JP | 2019-23021 A  | 2/2019  |
| JP | 2019-34591 A  | 3/2019  |

* cited by examiner

METHOD AND DEVICE FOR CONTROLLING VEHICLE ACCELERATION ON A CURVED ROAD USING CURVE INFORMATION

TECHNICAL FIELD

The present invention relates to a driving support method and a driving support device.

BACKGROUND

A driving support device is proposed which controls an automatic travel control of a vehicle by accelerating and decelerating the vehicle so that driving parameters of the vehicle approach a predetermined target value. The driving support device determines a curve travel section where the vehicle travels on a curve and prohibits acceleration by the automatic travel control in the curve travel section (see Japanese Patent Laid-Open Publication No. 2017-47710).

SUMMARY

According to the driving support device of Japanese Patent Laid-Open Publication No. 2017-47710, on the premise that the curve travel section is specified, acceleration by automatic travel control in the curve travel section is prohibited. Therefore, in a case where a curve information regarding a curved road on the road has not been acquired, the vehicle may not be able to accelerate properly on the curved road or after passing through the curved road, for example, the vehicle may suddenly accelerate.

The present invention has been made in view of the above problems, and an object of the present invention is to provide a driving support method and a driving support device capable of realizing appropriate acceleration of a vehicle on a curved road, even when a curve information regarding the curved road on the road has not been acquired.

When accelerating a vehicle toward a set speed after the vehicle travels on a curved road at a vehicle speed equal to or lower than a speed limit based on the curved road, a driving support method and a driving support device, according to an aspect of the present invention, accelerate the vehicle by a first acceleration in a case of acquiring a curve information related to the curved road, and accelerate the vehicle by a second acceleration smaller than the first acceleration in a case of not acquiring the curve information.

According to the present invention, it is possible to realize appropriate acceleration of a vehicle on a curved road and acceleration of the vehicle after passing through the curved road, even when a curve information regarding the curved road on the road has not been acquired.

DETAILED DESCRIPTION

Figure 1:
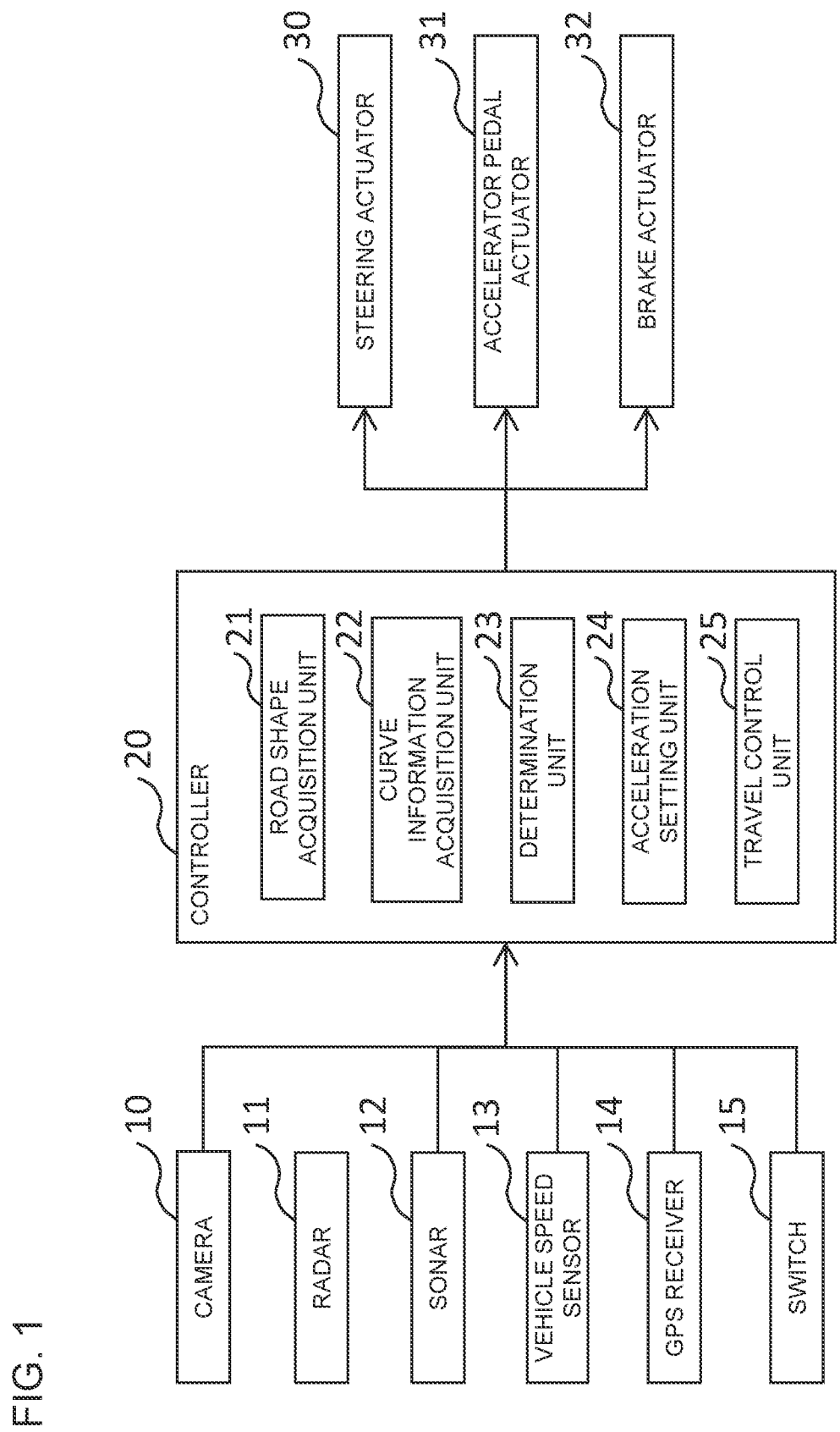
FIG. 1 is a block diagram illustrating a configuration of a driving support device according to an embodiment of the present invention.

Hereinafter, embodiments of the present invention will be described with reference to the drawings. In the description of the drawings, the same items are designated by the same reference numerals and duplicate description will be omitted.

[Configuration of Driving Support Device]

A configuration example of the driving support device 1 will be described with reference to FIG. 1. The driving support device 1 is mounted on an own vehicle having an automatic driving function. The automatic driving function includes ACC (Adaptive Cruise Control), lane keeping, auto lane change, auto parking, and the like, but in the present embodiment, the driving support device 1 is mainly used for ACC. ACC is an automatic driving function that automatically controls acceleration/deceleration of the own vehicle up to a set speed set in advance by the user to follow the preceding vehicle. Vehicle distance control is also performed so as to maintain the distance between the vehicles according to the set speed at this time.

The follow-up control also includes a control for following the preceding vehicle after detecting the start of the preceding vehicle while the vehicle is stopped such as waiting for a signal or in a traffic jam.

As shown in FIG. 1, the driving support device 1 includes a camera 10, a radar 11, a sonar 12, a vehicle speed sensor 13, a GPS receiver 14, a switch 15, a controller 20, a steering actuator 30, an accelerator pedal actuator 31 and a brake actuator 32. In addition, the driving support device 1 may include a navigation device (not shown).

A plurality of cameras 10 are installed in the front, side, rear, side mirrors, etc. of the own vehicle. The camera 10 has an image pickup device such as a CCD (charge-coupled device) or a CMOS (complementary metal oxide semiconductor). The camera 10 detects objects existing around the own vehicle (pedestrians, bicycles, two-wheeled vehicles, other vehicles, etc.) and information around the own vehicle (lane markings, traffic lights, signs, pedestrian crossings, intersections, etc.). The camera 10 outputs the captured image to the controller 20.

A plurality of radars 11 are installed in the front, front side, rear side, etc. of the own vehicle. The radar 11 emits radio waves to an object around the own vehicle and measures the reflected wave to measure the distance and direction to the object. The radar 11 outputs the measured data to the controller 20.

The sonar 12 is installed on the front bumper or front grill. The sonar 12 emits ultrasonic waves and measures the reflected waves to measure the distance and direction to an object in the vicinity of the own vehicle (for example, about 1 to 2 m). The sonar 12 outputs the measured data to the controller 20.

The vehicle speed sensor 13 detects the speed of the own vehicle and outputs the detected speed to the controller 20.

The GPS receiver 14 detects the position information of the own vehicle on the ground by receiving the radio wave from the artificial satellite. The position information of the own vehicle detected by the GPS receiver 14 includes latitude information and longitude information. The method of detecting the position information of the own vehicle is not limited to using the GPS receiver 14.

For example, the position may be estimated using a method called odometry. The odometry is a method of estimating the position of the own vehicle by acquiring the movement amount and the movement direction of the own vehicle according to the rotation angle and the rotation angular velocity of the own vehicle. The place where the GPS receiver 14 is installed is not particularly limited, but as an example, the GPS receiver 14 is installed on the instrument panel of the own vehicle. The GPS receiver 14 outputs the detected position information to the controller 20.

A plurality of switches 15 are installed on the steering wheel. The plurality of switches 15 include a switch for adjusting the set speed controlled by the ACC, a switch for setting the distance between the vehicles when the ACC is performed, and a switch for a follow-up running when the preceding vehicle starts. In the present embodiment, the switch 15 will be described as a physical switch, but the switch 15 is not limited thereto. The switch 15 may be a virtual switch. When the switch 15 is a virtual switch, the switch 15 may be displayed on the touch panel used in the navigation device.

The controller 20 is an electronic control unit (ECU) Electronic Control unit having a CPU (Central Processing Unit), a ROM (Read Only Memory), a RAM (Random Access Memory), a CAN (Controller Area Network) communication circuit, and the like.

A computer program for functioning as the driving support device 1 is installed in the controller 20. By executing the computer program, the controller 20 functions as a plurality of information processing circuits included in the driving support device 1. Here, an example is shown in which a plurality of information processing circuits included in the driving support device 1 are realized by software. However, it is also possible to configure information processing circuits by preparing dedicated hardware for executing each of the following information processing. Further, a plurality of information processing circuits may be configured by individual hardware.

The controller 20 includes a road shape acquisition unit 21, a curve information acquisition unit 22, a determination unit 23, an acceleration setting unit 24, and a travel control unit 25 as a plurality of information processing circuits.

The road shape acquisition unit 21 acquires the presence of a shape of the road ahead on which the own vehicle travels based on the image acquired from the camera 10 and the information around the own vehicle acquired by the radar 11 and the sonar 12. For example, the road shape acquisition unit 21 extracts a lane marking from an image acquired from the camera 10 and acquires the shape of the lane in which the own vehicle travels. In addition, the road shape acquisition unit 21 may acquire the shape of the road on which the own vehicle travels from a navigation device (not shown).

The curve information acquisition unit 22 calculates the radius of curvature of the road on which the own vehicle travels as curve information based on the shape of the road acquired by the road shape acquisition unit 21. For example, the curve information acquisition unit 22 calculates a minute change amount $\Delta\theta$ of the posture of the own vehicle (direction in which the own vehicle faces), which is assumed when the own vehicle travels by a minute distance $\Delta s$ along the shape of the road. The radius of curvature is correctly calculated by dividing $\Delta s$ by $\Delta\theta$. In addition, the curve information acquisition unit 22 may acquire the radius of curvature of the road on which the own vehicle travels as curve information from a navigation device (not shown).

The curve information acquisition unit 22 may comprehensively calculate the curve information based on both the curve information acquired from the navigation device and the curve information calculated based on the shape of the road. For example, if the own vehicle has not yet entered the curved road, the camera cannot sufficiently image the curved road, so that it may not be possible to calculate the curve information with sufficiently high accuracy based on the shape of the road acquired by the road shape acquisition unit 21. In such a case, the curve information acquisition unit 22 mainly acquires the curve information related to the curved road from the navigation device. Further, when the own vehicle is traveling on the curved road, the curve information acquisition unit 22 calculates the radius of curvature of the road on which the own vehicle travels, as curve information, mainly based on the shape of the road acquired by the road shape acquisition unit 21.

If both the curve information acquired from the navigation device and the curve information calculated based on the shape of the road have been successfully acquired, the curve information acquisition unit 22 may give priority to and use the curve information calculated based on the shape of the road. Compared to the curve information acquired from the navigation device, the curve information calculated based on the shape of the road reflects conditions of the current curved road more strongly and is considered to be more reliable. Thus, the curve information calculated based on the shape of the road is used with high priority.

When the curve information has been acquired, the curve information acquisition unit 22 sets the acquisition status of the curve information to "acquisition completed". On the other hand, the curve information acquisition unit 22 sets the acquisition status of the curve information to "acquisition failure" when the curve information has not been acquired.

Here, "when the curve information has been acquired" means the case where at least one of the curve information acquired from the navigation device and the curve information calculated based on the shape of the road have been acquired. Further, "when the curve information has not been acquired" means that the case where neither the curve information acquired from the navigation device, nor the curve information calculated based on the shape of the road have not been acquired.

In addition, the case where the accuracy of the calculated or acquired curve information exceeds the predetermined level may be treated as "when the curve information has been acquired", while the case where the accuracy of the calculated or acquired curve information is below the predetermined level may be treated as "when the curve information has not been acquired".

The determination unit 23 determines whether the curve information acquisition unit 22 has acquired the curve information. Specifically, the determination unit 23 refers to the acquisition status of the curve information by the curve information acquisition unit 22, and if the acquisition status is "acquisition completed", the determination unit 23 determines that the curve information has been acquired. On the other hand, if the acquisition status is "acquisition failure", the determination unit 23 determines that the curve information has not been acquired.

In addition, the determination unit 23 may determine whether there is an acceleration instruction of a user on the own vehicle. For example, when there is an accelerator operation by the user or when there is an operation of the switch 15 that increases the set speed controlled by the ACC, the determination unit 23 determines that there is the acceleration instruction of the user.

When the own vehicle is traveling on the curved road, the determination unit 23 may prohibit the operation of the switch 15 for increasing the set speed and may determine whether there is the acceleration instruction of the user of the own vehicle, excluding the operation of increasing the set speed. While the own vehicle is traveling on the curved road and accelerating toward the set speed, it is not necessary to prohibit the operation of the switch 15 for increasing the set speed.

In addition, the determination unit 23 may determine whether the speed limit with respect to the vehicle speed of the own vehicle has been released. Here, "the speed limit has been released" includes both the concepts of "there is no limit on the upper limit of the vehicle speed of the own vehicle" and "the speed limit is increased". In other words, "the speed limit has been released" means that the restrictions on the upper limit of the vehicle speed of the own vehicle are relaxed.

The determination unit 23 may determine that "the speed limit has been released" when there is no "speed limit" at the time of the current determination. Further, the determination unit 23 may determine the "speed limit" for each predetermined cycle or for each predetermined processing step in the controller 20, and may determine that "the speed limit has been released" in a case where the "speed limit" at the time of the current determination is higher than the "speed limit" at the time of the previous determination. In cases other than these, the determination unit 23 may determine that "the speed limit has not been released".

The acceleration setting unit 24 sets the acceleration of the own vehicle when the own vehicle travels on the curved road. For example, the acceleration setting unit 24 sets the speed limit when the own vehicle travels on the curved road based on the curve information and sets the acceleration of the own vehicle so that the own vehicle travels on the curved road at a vehicle speed equal to or lower than the set speed limit.

Here, the "speed limit" may be set according to the radius of curvature of the curved road. For example, the "speed limit" set when the radius of curvature of the curved road is small may be set smaller than the "speed limit" set when the radius of curvature of the curved road is large. Further, the "speed limit" may be set in multiple stages according to the radius of curvature of the curved road. Further, the "speed limit" may be set as a predetermined speed when the radius of curvature of the curved road is equal to or less than a predetermined value.

Further, one "speed limit" may be set for the entire curved road, or the curved road may be divided into a plurality of sections along the traveling direction of the own vehicle and a different "speed limit" may be set for each section.

A case where the curved road is divided into a plurality of sections along the traveling direction of the own vehicle and the different "speed limit" is set for each section will be described. For example, the degree of bending of the road near the center of the curved road is often steeper than the degree of bending of the road near the entrance and exit of the curved road. That is, the radius of curvature in the section near the center of the curved road is often shorter than the radius of curvature in the section near the entrance and the exit of the curved road. In such a case, the speed limit set in the section near the center of the curved road is set smaller than the speed limit set in the section near the entrance and the exit of the curved road.

Therefore, as a result of the acceleration of the own vehicle being set by the acceleration setting unit 24 so that the own vehicle travels on the curved road at a vehicle speed equal to or lower than the speed limit, the own vehicle traveling on the curved road decelerates near the entrance of the curved road and accelerates near the exit of the curved road.

In other words, the restrictions on the vehicle speed become stricter toward the center from the entrance of the curved road, and the own vehicle gradually decelerates. Also, as the vehicle moves from the center of the curved road to the exit, the restriction on the vehicle speed becomes looser (that is, the speed limit is released), and the own vehicle gradually accelerates. Then, after passing through the curved road, the own vehicle is controlled to travel at the set speed.

When decelerating the own vehicle to a vehicle speed equal to or lower than the speed limit, the acceleration setting unit 24 may refer to the determination result by the determination unit 23, and if it is determined that the curve information has not been acquired, the acceleration setting unit 24 may set the acceleration of the own vehicle for accelerating toward the set speed. That is, when the curve information has not been acquired, the acceleration setting unit 24 may set the acceleration so that the own vehicle returns to the state of traveling at the set speed.

Further, when accelerating the own vehicle toward the set speed, the acceleration setting unit 24 may refer to the determination result by the determination unit 23, and may set a first acceleration if it is determined that the curve information has been acquired. On the other hand, the acceleration setting unit 24 may set a second acceleration smaller than the first acceleration if it is determined that the curve information has not been acquired.

In addition, when accelerating the own vehicle toward the set speed, the acceleration setting unit 24 may refer to the determination result by the determination unit 23 and may set a predetermined acceleration (a user-set acceleration) to accelerate the own vehicle based on the acceleration instruction if it is determined that there is the acceleration instruction by the user.

The travel control unit 25 controls the own vehicle to accelerate or decelerate at the acceleration set by the acceleration setting unit 24. More specifically, the travel control unit 25 controls the accelerator pedal actuator 31 and the brake actuator 32 so that the own vehicle accelerates or decelerates at the acceleration set by the acceleration setting unit 24. Further, the travel control unit 25 controls the steering actuator 30 so that the own vehicle travels along the road shape acquired by the road shape acquisition unit 21, in particular, along the lane in which the own vehicle travels.

[Processing Procedure of the Driving Support Device]

Figure 2:
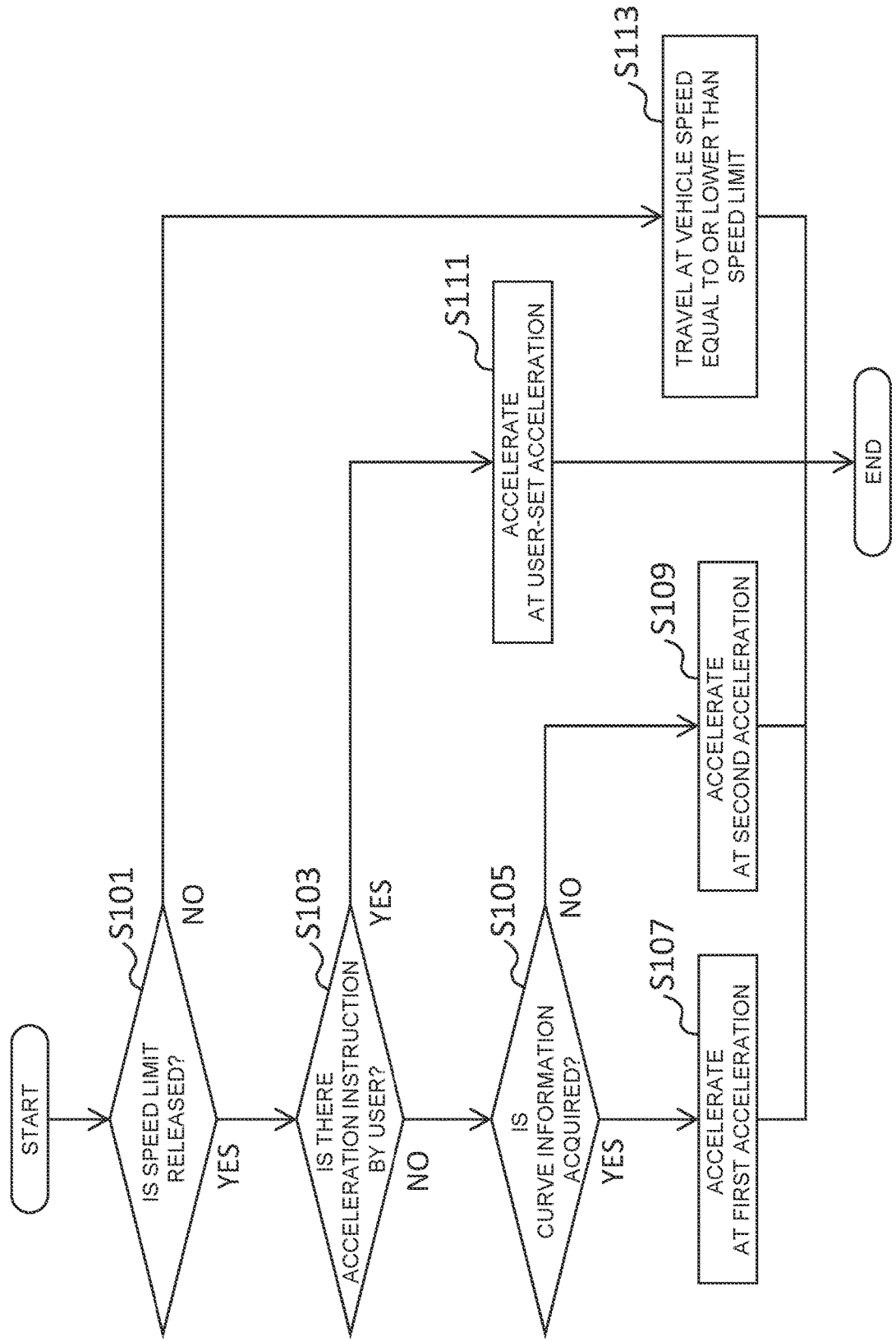
FIG. 2 is a flowchart illustrating a processing of the driving support device according to the embodiment of the present invention.

Next, the processing procedure of the driving support device according to the present embodiment will be described with reference to the flowchart of FIG. 2. The process of the driving support device shown in FIG. 2 is a process when the own vehicle is traveling on a curved road and may be repeatedly executed at a predetermined cycle.

In step S101, the determination unit 23 determines whether the speed limit for the vehicle speed of the own vehicle has been released.

When it is determined that the speed limit has not been released (NO in step S101), in step S113, the acceleration setting unit 24 sets the acceleration of the own vehicle such that the own vehicle travels on the curved road at a vehicle speed equal to or lower than the set speed limit, and the travel control unit 25 controls the own vehicle to accelerate or decelerate at the set acceleration.

When it is determined that the speed limit has been released (YES in step S101), in step S103, the determination unit 23 determines whether there is the acceleration instruction by the user.

When it is determined that there is the acceleration instruction by the user (YES in step S103), in step S111, the acceleration setting unit 24 sets the user-set acceleration to accelerate the own vehicle based on the acceleration instruction, and the travel control unit 25 controls so that the own vehicle accelerates at the set acceleration.

When it is determined that there is not the acceleration instruction by the user (NO in step S103), in step S105, the determination unit 23 determines whether the curve information acquisition unit 22 has acquired the curve information.

When it is determined that the curve information has been acquired (YES in step S105), the acceleration setting unit 24 sets the first acceleration in step S107, and the travel control unit 25 controls the own vehicle to accelerate at the first acceleration.

On the other hand, when it is determined that the curve information has not been acquired (NO in step S105), the acceleration setting unit 24 sets the second acceleration in step S109, and the travel control unit 25 controls the own vehicle to accelerate at the second acceleration.

Effect of Embodiments

As explained in detail above, a driving support method and a driving support device according to the present embodiment control a controller to drive a vehicle at a set speed after driving the vehicle along a curved road. When accelerating a vehicle toward the set speed after the vehicle travels on the curved road at a vehicle speed equal to or lower than a speed limit based on the curved road, the controller determines whether a curve information related to the curved road has been acquired, accelerates the vehicle by a first acceleration in a case of acquiring the curve information, and accelerates the vehicle by a second acceleration smaller than the first acceleration in a case of not acquiring the curve information.

As a result, even when the curve information regarding the curved road on the road has not been acquired, it is possible to realize appropriate acceleration of the vehicle on the curved road and acceleration of the vehicle after passing through the curved road. In particular, it is possible to prevent the vehicle from suddenly accelerating when the vehicle has not completed passing through the curved road, and as a result, it is possible to reduce the possibility that a sudden centrifugal force is generated in the vehicle. In addition, the discomfort felt by the user in the vehicle can be reduced, and the comfort can be improved. In addition, as a result of suppressing the sudden acceleration of the vehicle, the physical load on the vehicle can be suppressed, and the occurrence of operation abnormalities and failures in the vehicle and in-vehicle equipment can be reduced.

Further, when accelerating the vehicle traveling on the curved road toward the set speed, the driving support method and the driving support device according to the present embodiment may accelerate the vehicle by the first acceleration in a case of at least one of in a case of having acquired the curve information based on an image captured by a camera, and in a case of having acquired the curve information based on a navigation device mounted on the vehicle. As a result, even when the curved road cannot be sufficiently imaged by the camera, the curve information can be acquired based on the information from the navigation device, and the appropriate acceleration of the vehicle can be realized. Further, even if the curve information cannot be acquired based on the information from the navigation device, appropriate acceleration of the vehicle can be realized when the curved road can be imaged by the camera and the curve information can be calculated.

Furthermore, when decelerating the vehicle to the vehicle speed equal to or lower than the speed limit, the driving support method and the driving support device according to the present embodiment may determine whether the curve information has been acquired, and may stop deceleration of the vehicle and starting acceleration of the vehicle toward the set speed in a case of determining that the curve information has not been acquired. As a result, when the own vehicle does not pass through the curved road, acceleration toward the set speed is performed, and the vehicle can return to the state of traveling at the set speed. In addition, the convenience of the user for driving the vehicle is improved.

Further, when accelerating the vehicle traveling on the curved road toward the set speed and having not acquired the curve information, the driving support method and the driving support device according to the present embodiment may determine whether there is an acceleration instruction by a user of the vehicle, and may accelerate the vehicle based on the acceleration instruction in a case of determining that there is the acceleration instruction. When the vehicle is accelerated based on the user's instruction, the user can cope with the increase in centrifugal force caused by the vehicle traveling on the curved road. Therefore, it is possible to reduce the discomfort felt by the user and at the same time reflect the intention of the user in the driving of the vehicle.

Furthermore, when controlling the vehicle traveling on the curved road, the driving support method and the driving support device according to the present embodiment may determine whether there is an acceleration instruction of a user of the vehicle, excluding an operation of increasing the set speed, and may accelerate the vehicle based on the acceleration instruction in a case of determining that there is the acceleration instruction. As a result, the user's intention can be reflected in the driving of the vehicle while reducing the discomfort felt by the user. Further, even if an operation for increasing the set speed is mistakenly performed while the vehicle is traveling on the curved road, the vehicle is not accelerated based on the operation, and thus, it is possible to reduce the possibility of acceleration not intended by the user.

Respective functions described in the above embodiment may be implemented by one or plural processing circuits. The processing circuits include programmed processors, electrical circuits, etc., as well as devices such as application specific integrated circuits (ASIC) and circuit components arranged to perform the described functions, etc.

Although the contents of the present invention have been described above with reference to the embodiment, the present invention is not limited to these descriptions, and it will be apparent to those skilled in the art that various modifications and improvements can be made. It should not be construed that the present invention is limited to the descriptions and the drawings that constitute a part of the present disclosure. On the basis of the present disclosure, various alternative embodiments, practical examples, and operating techniques will be apparent to those skilled in the art.

It is needless to mention that the present invention also includes various embodiments that are not described herein. Therefore, the technical scope of the present invention is to be defined only by the invention specifying matters according to the scope of claims appropriately obtained from the above descriptions.

REFERENCE SIGNS LIST

1 driving support device
10 camera 11 radar
12 sonar
13 vehicle speed sensor
14 GPS receiver
15 switch
20 controller
21 road shape acquisition unit
22 curve information acquisition unit
23 determination unit
24 acceleration setting unit
25 travel control unit
30 steering actuator
31 accelerator pedal actuator
32 brake actuator

The invention claimed is:

1. A driving support method for controlling a controller to drive a vehicle at a set speed after driving the vehicle along a curved road, comprising:
detecting a presence of the curved road ahead of the vehicle;
when the controller decelerates the vehicle to a vehicle speed equal to or lower than a speed limit based on the curved road, determining whether a curve information related to a curvature radius of the curved road has been successfully acquired; and
stopping deceleration of the vehicle and starting acceleration of the vehicle toward the set speed with a second acceleration smaller than a first acceleration in a case of determining that the curve information has not been successfully acquired,
wherein the first acceleration is used when the curve information has been successfully acquired, and
wherein determining whether the curve information has been successfully acquired comprises determining whether the curvature radius of the curved road has been correctly calculated or received from at least one of a camera or a navigation device.

2. The driving support method according to claim 1, comprising:
when the controller accelerates the vehicle toward the set speed after the vehicle travels on the curved road at the vehicle speed equal to or lower than the speed limit,
determining whether the curve information has been acquired;
accelerating the vehicle by a first acceleration in a case of determining that the curve information has been acquired; and
accelerating the vehicle by a second acceleration smaller than the first acceleration in a case of determining that the curve information has not been acquired.

3. The driving support method according to claim 2, comprising:
when the controller accelerates the vehicle traveling on the curved road toward the set speed, accelerating the vehicle by the first acceleration in a case of at least one of
having acquired the curve information based on an image captured by a camera, and
having acquired the curve information based on a navigation device mounted on the vehicle.

4. The driving support method according to claim 1, comprising:
when the controller accelerates the vehicle traveling on the curved road toward the set speed and has not acquired the curve information,
determining whether there is an acceleration instruction by a user of the vehicle; and
accelerating the vehicle based on the acceleration instruction in a case of determining that there is the acceleration instruction.

5. The driving support method according to claim 1, comprising:
when the controller controls the vehicle traveling on the curved road,
determining whether there is an acceleration instruction of a user of the vehicle, excluding an operation of increasing the set speed; and
accelerating the vehicle based on the acceleration instruction in a case of determining that there is the acceleration instruction.

6. A driving support device comprising a controller to drive a vehicle at a set speed after travelling along a curved road, wherein the controller is configured to:
detect a presence of the curved road ahead of the vehicle;
determine whether a curve information related to a curvature radius of the curved road has been successfully acquired;
when decelerating the vehicle to a vehicle speed equal to or lower than a speed limit based on the curved road, set an acceleration for stopping deceleration of the vehicle and starting acceleration of the vehicle toward the set speed with a second acceleration smaller than a first acceleration in a case of determining that the curve information has not been successfully acquired; and
accelerate the vehicle at the acceleration set by the controller,
wherein the first acceleration is used when the curve information has been successfully acquired, and
wherein determining whether the curve information has been successfully acquired comprises determining whether the curvature radius of the curved road has been correctly calculated or received from at least one of a camera or a navigation device.

* * * * *